United States Patent [19]

Vito

[11] Patent Number: 4,924,065

[45] Date of Patent: May 8, 1990

[54] WELDING ELECTRODE HOLDING DEVICE WITH QUICK EJECTION OF THE WORN OUT ELECTRODE

[76] Inventor: Bruno Vito, Fraz. Mombresto, Pessinetto- TO, Italy

[21] Appl. No.: 321,097

[22] Filed: Mar. 9, 1989

[30] Foreign Application Priority Data

Mar. 15, 1988 [IT] Italy .............................. 52972/88[U]

[51] Int. Cl.⁵ .................................................. B23K 9/28
[52] U.S. Cl. ...................................... 219/138; 219/136
[58] Field of Search ........................ 219/75, 136, 138; 279/1 E, 51

[56] References Cited

U.S. PATENT DOCUMENTS

| 1,458,359 | 6/1923 | Riley | 279/1 E |
|---|---|---|---|
| 2,357,844 | 9/1944 | Nellis . | |
| 2,798,145 | 7/1957 | Vogel | 219/75 |
| 2,863,983 | 12/1958 | Kane et al. | 219/75 |
| 2,930,884 | 3/1960 | Monax | 219/138 |
| 2,936,365 | 5/1960 | Niemi | 219/138 |

FOREIGN PATENT DOCUMENTS 1008430  5/1957  Fed. Rep. of Germany .

Primary Examiner—Clifford C. Shaw
Attorney, Agent, or Firm—Bachman & LaPointe

[57] ABSTRACT

A welding electrode device with quick ejection of the worn out electrode comprises an extended hollow body (12, 112) in which a tubular pin (16, 116) is inserted, on which a jaw sleeve (19, 132) is assembled and which is extended in correspondence with an end opening (15, 109) of said hollow body (12, 112) able to contain the welding electrode; the pin (16, 121) has a rivet (28, 125) sliding into it and pushed towards said opening (15, 109) of the body by elastic means (29, 128); the sleeve (19, 132) has longitudinal grooves (21, 134) obtained in correspondence with said end and has oblique inner (22, 136) and outer (24, 133) walls which cooperate with corresponding inner (14, 115) and outer walls respectively (27, 121) of the body and of the pin, in order to expand in the grooved portion (21, 134) during its movement on the pin (16, 121) due to the action of a pushbutton (31, 138, 129) connected to it and held by the cover in such a way to be manually pressed from the exterior; power feeding means to the electrode are designed to go through the interior of the device.

10 Claims, 2 Drawing Sheets

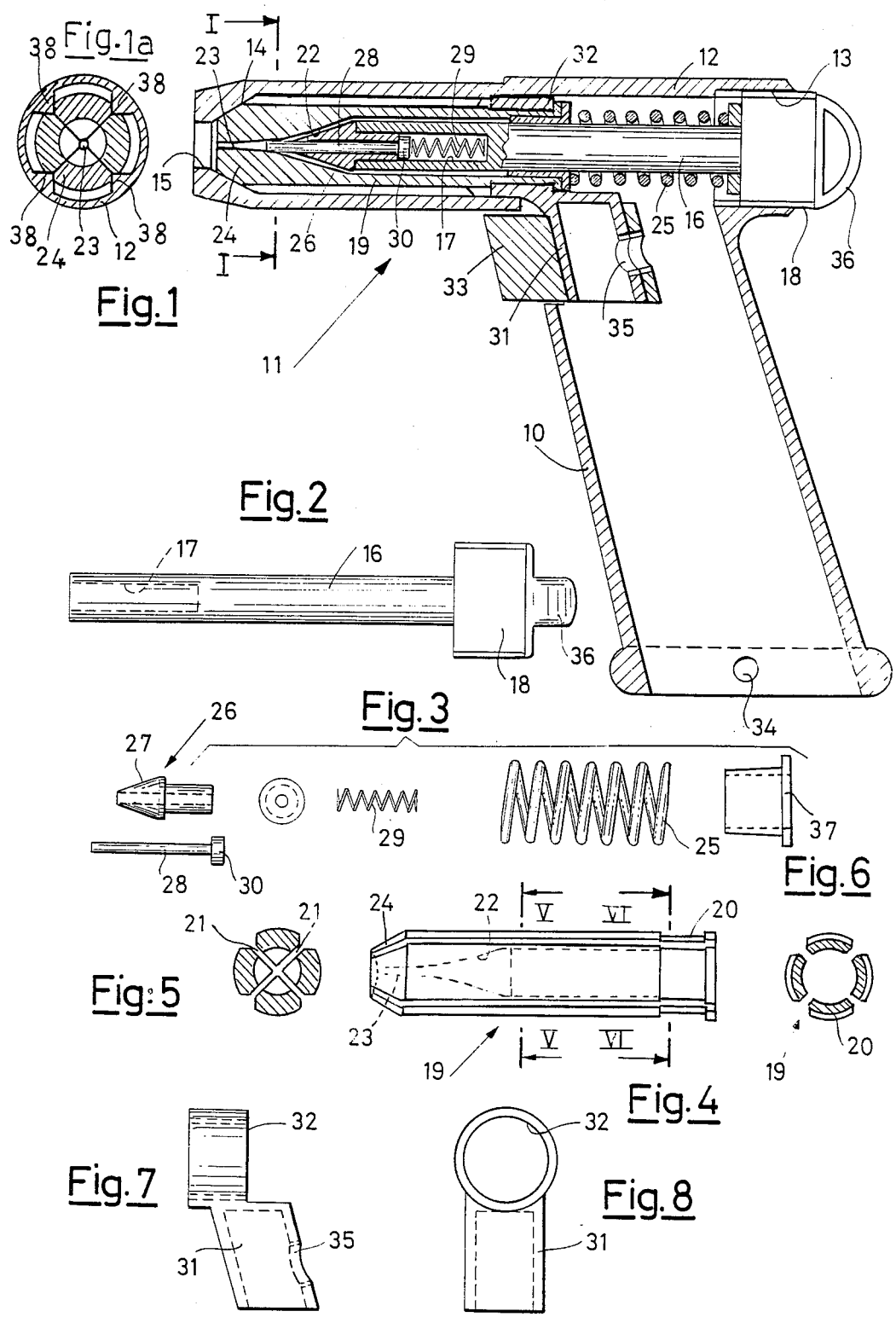

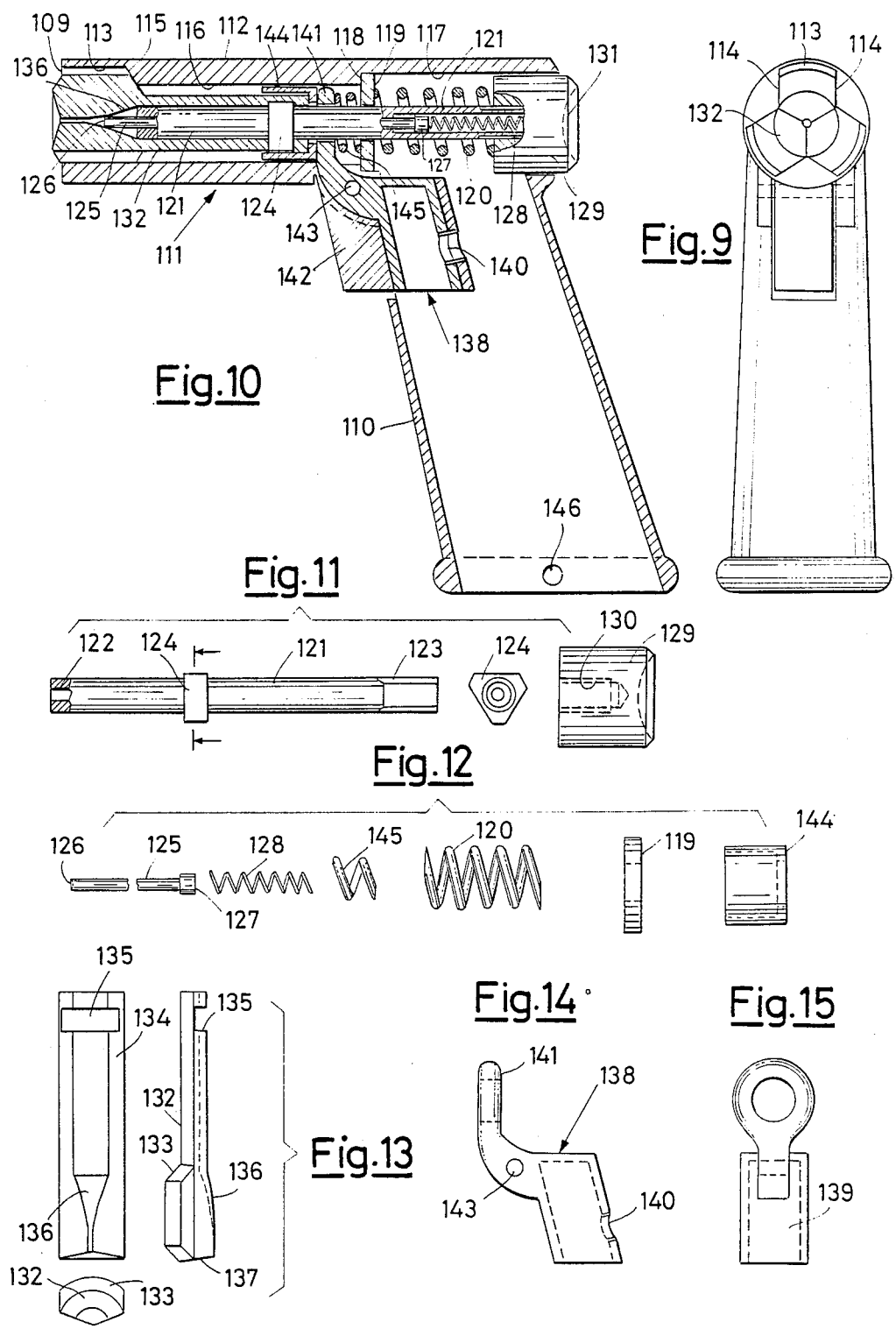

WELDING ELECTRODE HOLDING DEVICE WITH QUICK EJECTION OF THE WORN OUT ELECTRODE

BACKGROUND OF THE INVENTION

Object of the invention is a welding electrode holding device with quick ejection of the worn out electrode.

The operations for the insertion and substitution of the electrode are rather complex and laborious with manual welding devices; said manual devices are not so easy to be handled by the user as they often have unpractical shapes and dimensions.

SUMMARY OF THE INVENTION

The purpose of the invention is to propose a welding electrode holding device by which the operations of insertion and ejection of the electrode be extremely quick and simple and in the meantime the device be easy to be handled by anyone.

For these and other purposes which may be better appreciated as the description follows, the invention proposes a welding electrode holding device with quick ejection of the worn out electrode characterized in that it comprises a hollow extended body into which a tubular pin is inserted, and on same pin a jaw sleeve is assembled extending in correspondence with an end opening of said hollow body able to contain the welding electrode; the pin holds a sliding rivet into it which is pushed towards said opening of the body by elastic means; the sleeve holds longitudinal grooves obtained in correspondence with said end and oblique inner and outer walls cooperating with corresponding inner and outer walls of the body and of the pin in order to expand where the grooves are located during its motion on the pin under the action of a pushbutton connected to the cover and held by same cover to be manually pressed by the outside; current feeding means through the interior of the device to the electrode are designed.

BRIEF DESCRIPTION OF THE DRAWINGS

Two alternative but not restrictive embodiments of the device according to the invention are now described. Please refer to the following drawings:

FIG. 1 is the section view of a first embodiment of the device according to the invention;

FIG. 1a is the section according to line I—I of FIG. 1;

FIG. 2 is the view of a part of the device of FIG. 1;

FIG. 3 is the exploded view of some other parts of the device of FIG. 1;

FIG. 4 is the view of a further part;

FIGS. 5 and 6 are respectively the sections according to lines V—V and VI—VI of FIG. 4;

FIGS. 7 and 8 are respectively the side and front views of a part of the device of FIG. 1;

FIG. 9 is the front view of a second embodiment of the device;

FIG. 10 is the entire section view of the device of FIG. 9;

FIG. 11 is the exploded view of some parts of the device of FIGS. 9 and 10;

FIG. 12 is the exploded view of other parts;

FIG. 13 is a three-views projection of the various jaws comprised in the spindle of the device of FIGS. 9 and 10;

FIGS. 14 and 15 are respectively the side and front views of a part of the device of FIGS. 9 and 10.

DETAILED DESCRIPTION

The device of the invention comprises a handgrip 10 on which an electrode holder spindle 11 is assembled.

The outer body 12 of the spindle 11 is integral to the handgrip and is internally hollow. Its farthest back end has internal truncated cone tapering 14 and is jointed with a parallel axial hole 15 communicating with the outside.

A pin 16 equipped with dead hole 17 at one end and with swelling 18 at the other end is inserted in the cover 12. The surface of the swelling 18 is threaded to be screwed in the threaded portion 13 of the cover 12.

A quill 19 consisting of a plurality of jaws, identical to one another and located at an angular equal distance, is inserted on the pin 16. The jaws 19 at one end have a seating 20, while at the other end longitudinal grooves 21 placed at angular equal distance enable this end to expand and to close again during the movement of the quill 19, as explained further on.

In correspondence with said grooved section 21, the quill which is identified by the jaws 19 has an inner hole 22 having truncated cone taperings; said quill is joined with the last section of a hole 23 opening to the outside.

The outer walls 24 of the jaws which form the quill 19, in correspondence with the hole 23, are tapered to mate with the inner walls 14 of the cover 12, as the quill 19 is kept pushed in such position by a spring 25 which is compressed between the threaded end 20 of the quill 19 and the head 18 of the pin 16.

A tang 26 is housed in the interior of the hole 17 of the pin 16, in the section 22 of the quill 19; the head 27 of said tang 26 cooperates with the inner surface of the hole 22 of the quill 19.

The tang 26 is drilled and a rivet 28 is inserted into it, said rivet is kept pushed against the bottom of the tang 26 by a small spring 29 compressed between the head 30 of the rivet and the bottom of the hole 17 of the pin 16 where it is housed.

A trigger 31 is housed in a hole of the handgrip 10 and holds a bush-like appendix 32 which is inserted on the seatings 20 of the jaws 19 thus making an entire unit of these latter ones integral to trigger 31.

The body 24 is being moved towards the back opposing spring 25 when pressing on the insulating covering 33 of the trigger 31. As the inner walls 22 slide on the walls 27 of the tang 26 the grooved end 23 of the body 19 is able to expand thanks to grooves 21, allowing the insertion of the welding electrode in its hole 23 pushing said electrode against the rivet 28 and moving it internally in the hole 17 opposing spring 29.

When releasing the pressure on the trigger 31-33, the body 19 will move forward pushed by spring 25 and the electrode will be locked in the hole 23 between the grooved walls.

The power cable from the welding machine will go through the hole 34 of the handgrip 10 and will be fastened to hole 35 of the trigger 31 in order to give current to the electrode.

After having accomplished the welding, the trigger 31-33 must again be pushed so that the body 19 moves backward again and releases the electrode which is being ejected by the movement of the rivet 28, due to the operation of the spring 29 which is now free to extend.

The end 18 of the pin 16 is screwed and unscrewed thanks to the appendix 36 to adjust the compression of the spring 25 and hence the locking and ejection forces of the electrode.

With reference to FIGS. 9 to 15, the second embodiment of the device will be examined.

As for the design previously described, the device has an internally hollow handgrip 110, on which a cover 112 with the electrode holder spindle 111 is assembled.

The cover 112 of the spindle 111 is integral to the handgrip 110 which is also hollow for its entire length; its front end has a hole 109 with cylindrical surfaces 113 jointed with plane surfaces 114 (FIG. 9) which are parallel and opposed to each other at pairs and act as guides to jaws 132; the cylindrical faces 113 of the body 112 are tapered by other truncated cone faces 115 which are jointed towards the interior in one smaller single hole 116 which is axial and cylindrical and where the spindle body slides during the electrode substitution. Towards the back of the cover 112 the diameter of the hole increases in 117 forming a plane face 118 between diameter 116 and diameter 117 acting as a rest to a washer 119 which opposes the pressure of a spring 120.

In the middle of the cover 112, longitudinally, a spindle holding tube 121 is located; the interior of same is cylindrically shaped with a narrower diameter in the front farthest end 122 in order to guide a rivet 125; the latter is housed in the hole of the tube 121 and slides into it; the rivet has cylindrical shape longitudinally, whilst its farthest front face 126 is slightly concave to allow the quick centering of the electrode. A small spring 128 is housed in the interior back part of the tube 121; said spring, being compressed between a cap nut 129 and the head 127 of the rivet 125, pushes said rivet forward towards the outlet to eject the electrode as soon as allowed by the jaws 132. This takes place by pressing on the pushbutton 142 which insulates the trigger 138 or pressing in the middle of the concave surface 131 of the pushbutton nut. In fact, the external surface of the tube 121 is threaded in the farthest back 123, where the cap nut is screwed in 130, said cap nut is entrusted to adjust and contain the pressure of springs 120 and 128; said pushbutton 129 may also operate in the electrode substitution (as we have noticed).

The front external side of tube 121 has a swelling 124 with plane surfaces to push and escort the jaws 132 and the whole spindle during the forward movement for the electrode substitution, then withdraw said jaws against the truncated cone walls 115 of the cover 112 after the insertion of the new electrode and the released pressure on the ejection means. The number of jaws is subject to variation according to the type of spindle, but the parts of each spindle are identical; as can be noticed in FIGS. 9 and 13 the external feature of the jaws 132 is substantially cylindrical. From a cylindrical surface 132 having a minor diameter on the back side, a major diameter is obtained in the cylindrical front part by means of a truncated cone surface 133. Said surface 133 which joints the two diameters has the task of locking the electrode into the jaws when these, after the pressure on the ejection means is being released, are forcefully drawn, by the traction of the spring 120, against the truncated cone surfaces 115 of the cover 112. The inner back part of the jaws is also substantially cylindrical 134 except for the cross groove 135 towards the end, which operates as seating to the swollen faces 124 of the tube 121. The front inner surfaces have a radius shaped bent feature 136 which starts from the cylindrical surface 134 and is connected with the last section towards the exterior—also cylindrical—where the electrode is being inserted and locked. The outer side faces 137 of the jaws are slightly raking towards the middle of the spindle to enable the quick insertion of the electrode. On the farthest back end of the jaws a cup-shaped ring 144 is inserted to keep the jaws joined to one another also during the movement of the spindle in the cover 112.

As regards power feeding, the cable of the welding machine goes through the bottom hole 146 of the handgrip 110 to house in the bottom back seating of the trigger 139 where it is fastened by a screw in 140. The trigger 138 is hinged to the handgrip 110 by means of a pin 143; power is taken by the trigger to the body of the jaws by a small portion of spring 145 inserted in the tube behind the upper part of the trigger and exactly between the washer 119 and the annular surface 141 of the trigger; the light but constant pressure of said small spring pushes the trigger 138 and keeps it against the jaws 132 ensuring an efficient power contact to the electrode.

The substitution of the worn out electrode is carried out by the trigger 138; the insulating end 142 is being pressed rotating the trigger around the pin 143. Then, the upper end 141 presses the cup-shaped ring 144 pushing it forward together with jaws 132 and the whole spindle 121; the jaws 132 expand and the spring 128 pushes the rivet 125 towards the exterior and ejects the electrode through the open jaws 132.

This second embodiment of the device according to the invention operates the substitution of the electrode through the trigger 138 or through the pushbutton 129.

I claim:

1. Welding electrode device with quick ejection of the worn out electrode which comprises: a cover; an extended hollow body in the cover having an end opening; a tubular pin in said hollow body; a jaw sleeve assembled on said tubular pin and which is extended in correspondence with the end opening of said hollow body able to contain the welding electrode; elastic means in said hollow body; a rivet sliding into said pin and pushed towards the opening of the hollow body by said elastic means; a pushbutton connected to said sleeve; wherein said sleeve has longitudinal grooves adjacent said end opening and has oblique inner and outer walls which cooperate with corresponding inner and outer walls respectively of the body and of the pin, in order to expand in the grooved portion during its movement of the pin due to the action of said pushbutton connected to it and held by the cover in such a way to be manually pressed from the exterior; and power feeding means to the electrode designed to go through the interior of the device.

2. A device according to claim 1 including spring means in said hollow body, wherein the pin is rigidly inserted in the hollow body and on it the sleeve and is pushed by the spring means against the end opening of the hollow body; wherein the sleeve expands in correspondence with said grooves when moving away from the end opening opposing said spring means due to the action of the pushbutton; and wherein the pushbutton is held by a handgrip integral to the cover.

3. A device according to claim 2 wherein the pin is equipped with a swollen and threaded end having a side surface; wherein said swollen and threaded end is screwed in said hollow body; the side surface of the swelling providing a hitting piece for said spring means pushing the sleeve.

4. A device according to claim 2 wherein the pin has an end hole therein; and including a tang having a through hole, said tang being inserted in the hole of the pin and said tang having a head extending from the pin and forming said oblique walls of the pin on which the grooved end of the sleeve slides; wherein the rivet slides into the end hole of the pin and into the through hole of the tang.

5. A device according to claim 2 wherein the pushbutton consists of a trigger equipped with a bush which is screwed on the sleeve, and of an appendix to which the power feeding cables to the electrode are connected.

6. A device according to claim 1 wherein the jaw sleeve when moving is made integral to the tubular pin which in turn is integral to the pushbutton which moves it due to manual action, opposing elastic means which are compressed between said pushbutton and a bush inserted in the body; a second pushbutton hinged to the body and having a bush-like appendix inserted on the pin operating on a cup-shaped ring which is in turn inserted on the pin and on the sleeve.

7. A device according to claim 6 wherein the appendix of the second pushbutton, inserted on the pin is pushed against said cup-shaped ring by a spring pressed against the bush.

8. A device according to claim 7 wherein the second pushbutton is a trigger equipped with an appendix to which the power feeding cables to the electrode are connected.

9. A device according to claim 6 wherein the pin has a radially swollen section on which a corresponding groove of the sleeve is inserted.

10. A device according to claim 1 wherein said cover is substantially pistol-like.

* * * * *